United States Patent
Reddy et al.

(10) Patent No.: US 10,798,734 B2
(45) Date of Patent: Oct. 6, 2020

(54) METHOD AND WIRELESS DEVICE FOR TRANSMITTING RACH PREAMBLE IN WIRELESS COMMUNICATION NETWORK

(71) Applicants: Centre of Excellence in Wireless Technology, Chennai (IN); Indian Institute of Technology Madras (IIT Madras), Chennai (IN)

(72) Inventors: Budama Sree Charan Teja Reddy, Chennai (IN); Jeniston Deviraj Klutto Milleth, Chennai (IN); Sunil Kaimalettu, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS, Chennai (IN)

( * ) Notice: Subject to any disclaimer, the term of this patent is extended or adjusted under 35 U.S.C. 154(b) by 0 days.

(21) Appl. No.: 15/938,489

(22) Filed: Mar. 28, 2018

(65) Prior Publication Data
US 2019/0098659 A1 Mar. 28, 2019

(30) Foreign Application Priority Data
Mar. 28, 2017 (IN) .............................. 201741011028

(51) Int. Cl.
*H04W 74/00* (2009.01)
*H04W 74/08* (2009.01)
*H04B 1/713* (2011.01)

(52) U.S. Cl.
CPC ..... *H04W 74/004* (2013.01); *H04W 74/0833* (2013.01); *H04B 1/713* (2013.01)

(58) Field of Classification Search
CPC . H04W 74/004; H04W 74/0833; H04B 1/713
See application file for complete search history.

(56) References Cited

U.S. PATENT DOCUMENTS

| | | | |
|---|---|---|---|
| 2015/0223075 A1* | 8/2015 | Bashar | H04W 16/14 370/329 |
| 2017/0094689 A1* | 3/2017 | Lin | H04W 72/0453 |
| 2017/0171865 A1* | 6/2017 | Hwang | H04B 1/713 |
| 2017/0324587 A1* | 11/2017 | Lin | H04J 11/0023 |
| 2018/0077703 A1* | 3/2018 | Sun | H04W 72/0446 |
| 2018/0092064 A1* | 3/2018 | Ryu | H04W 48/12 |
| 2018/0131547 A1* | 5/2018 | Wang | H04L 27/2602 |

(Continued)

OTHER PUBLICATIONS

3GPP, TS GRAN E-UTRA Physical Channels and Modulation, TS 36.211 v11.5.0, All pges (Year: 2013).*

(Continued)

*Primary Examiner* — Robert C Scheibel

(57) ABSTRACT

Embodiments herein provide a method and wireless device for transmitting a RACH preamble in a wireless communication network. The method includes steps of configuring a Narrowband Physical Random Access Channel (NPRACH) preamble comprising a first mini preamble and a second mini preamble; and transmitting the first mini preamble in a first available consecutive Up-Link (UL) sub-frames and the second mini preamble in a subsequent consecutive UL sub-frames reserved for UL transmission in at least one frame duration.

24 Claims, 7 Drawing Sheets

(56) References Cited

U.S. PATENT DOCUMENTS

| | | | |
|---|---|---|---|
| 2018/0145802 A1* | 5/2018 | Hwang | H04W 72/04 |
| 2018/0199351 A1* | 7/2018 | Ro | H04W 72/10 |
| 2018/0248675 A1* | 8/2018 | Bhattad | H04L 27/2613 |
| 2018/0278291 A1* | 9/2018 | Liu | H04B 1/667 |
| 2019/0075602 A1* | 3/2019 | Lin | H04L 5/0053 |

OTHER PUBLICATIONS

3GPP TSG-RAN1 #84, R1-160275, NB-IoT—Single Tone Frequency NB-PRACH Design, All pages (Year: 2016).*

\* cited by examiner

| Special SF configuration | Normal CP in DL | | | Extended CP in DL | | |
|---|---|---|---|---|---|---|
| | DwPTS | UpPTS | | DwPTS | UpPTS | |
| | | Normal CP in UL | Extended CP in UL | | Normal CP in UL | Extended CP in UL |
| 0 | $6592.T_s$ | $(1+X).2192.T_s$ | $(1+X).2560.T_s$ | $7680.T_s$ | $(1+X).2192.T_s$ | $(1+X).2560.T_s$ |
| 1 | $19760.T_s$ | | | $20480.T_s$ | | |
| 2 | $21952.T_s$ | | | $23040.T_s$ | | |
| 3 | $24144.T_s$ | | | $25600.T_s$ | | |
| 4 | $26336.T_s$ | | | $7680.T_s$ | $(2+X).2192.T_s$ | $(2+X).2560.T_s$ |
| 5 | $6592.T_s$ | $(2+X).2192.T_s$ | $(2+X).2560.T_s$ | $20480.T_s$ | | |
| 6 | $19760.T_s$ | | | $23040.T_s$ | | |
| 7 | $21952.T_s$ | | | $12800.T_s$ | | |
| 8 | $24144.T_s$ | | | - | - | - |
| 9 | $13168.T_s$ | | | - | - | - |

FIG. 3

METHOD AND WIRELESS DEVICE FOR TRANSMITTING RACH PREAMBLE IN WIRELESS COMMUNICATION NETWORK

TECHNICAL FIELD

The present invention relates to wireless communication systems and more particularly relates to method and wireless device for transmitting Random Access Channel (RACH) preamble in wireless communication network. The present application is based on, and claims priority from an Indian Application Number 201741011028 filed on 28 Mar. 2017 the disclosure of which is hereby incorporated by reference herein.

BACKGROUND

The emergence of Internet of Things (IoT) brings the economical and societal benefits as it connects to most of electronic device(s) around a user. A standardized communication technology meeting wide variety of requirements posed by IoT is needed. Mobile communication technologies, like 4G LTE (Long Term Evolution), are providing various reliable services with broader coverage areas. In response to the IoT market needs, 3rd Generation Partnership Project (3GPP) standardized NarrowBand-IoT (NB-IoT), an Orthogonal frequency-division multiplexing (OFDM) based technology designed for the IoT, to enable a wide range of the electronic devices and services to be connected using cellular telecommunication bands.

The NB-IoT can be deployed "in-band" using resource blocks within LTE bands, or in the unused resource blocks of LTE "guard band" or as a "standalone" deployment in case of dedicated spectrum. The current standardized NB-IoT technology is defined for paired spectrum i.e. Frequency Division Duplex (FDD). The Time Division Duplex (TDD) version of NB-IoT is yet to be standardized. Specifications of in-band TDD NB-IoT should be in compliance with those of TD LTE (Time Division LTE) as they have to co-exist in the same band.

Although the features to be supported by TDD NB-IoT are expected to be same as that of the FDD NB-IoT, there may be subtle differences in specifications engendered by different frame structures used by the TD LTE and FD LTE (Frequency Division LTE). These differences should be carefully handled in defining the TDD NB-IoT in the line of existing NB-IoT specifications. One such difference arose in NPRACH (Narrowband Physical Random Access Channel) specification.

SUMMARY

Accordingly, embodiments herein provide a method for transmitting a RACH preamble in a wireless communication network. The method includes steps of configuring a Narrowband Physical Random Access Channel (NPRACH) preamble comprising a first mini preamble and a second mini preamble; and transmitting the first mini preamble in a first available consecutive Up-Link (UL) sub-frames and the second mini preamble in a subsequent consecutive UL sub-frames reserved for UL transmission in at least one frame duration.

In an embodiment, the method for configuring the NPRACH preamble includes steps of dividing the NPRACH preamble into the first mini preamble and the second mini preamble.

In an embodiment, the transmission of the first mini preamble and the second mini preamble includes steps of transmitting the first mini preamble in a first available consecutive Up-Link (UL) sub-frames and transmitting the second mini preamble in a subsequent continuous UL sub-frames reserved for UL transmission in at least one frame duration. Hence, the transmission of the NPRACH preamble, as configured, in such interval of the sub-frames therefore meets the design requirements and accommodate the TDD in case of the NB-IoT systems.

In an embodiment, the frame is one of a Time Division Duplex (TDD) LTE frame and a Frequency Division Duplex (FDD) LTE frame.

In an embodiment, the first mini-preamble and the second mini-preamble comprises a plurality of symbol groups followed by a GP. The duration of the GP is determined by a cell radius.

In an embodiment, the plurality of symbol groups are hopped across frequency resources. Each of the symbol group form the plurality of symbol groups comprises at least one symbol preceded by a Cyclic Prefix (CP). In an embodiment, a length of the CP in a first symbol group from the plurality of symbol groups is one of shorter than and equal to a length of the CP in remaining symbol groups from the plurality of symbol groups.

In an embodiment, the length of CP is based on at least one of UL-DL configuration and special sub-frame configuration.

In an embodiment, the number of symbols in the symbol group depends on UL-DL configuration to be used for transmission of the NPRACH preamble. In other words, the number of symbols in the symbol group is one of 2 and 3 when the UL-DL configuration is one of 1, 4, and 6. Further, the number of symbols in the symbol group is one of 4 and 5 when the UL-DL configuration is one of 0, 3, and 6. Similarly, the number of symbols in the symbol group is 1 when the UL-DL configuration is one of 2 and 5.

In an embodiment, the number of symbols in the symbol group of the first mini preamble and the second mini preamble is one of same and different.

Accordingly, embodiments herein provide a wireless device for transmitting a RACH preamble in a wireless communication network. The wireless device includes a processor, a memory, a preamble configuration circuitry for configuring a NPRACH preamble comprising a first mini preamble and a second mini preamble. Further, the wireless device includes a transmitter for transmitting the first mini preamble in a first available consecutive UL sub-frames and the second mini preamble in a subsequent consecutive UL sub-frames reserved for UL transmission in at least one frame duration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which:

FIG. 3 illustrates special sub-frame configurations supported by LTE TDD, according to prior art;

DETAILED DESCRIPTION OF INVENTION

Figure 1:
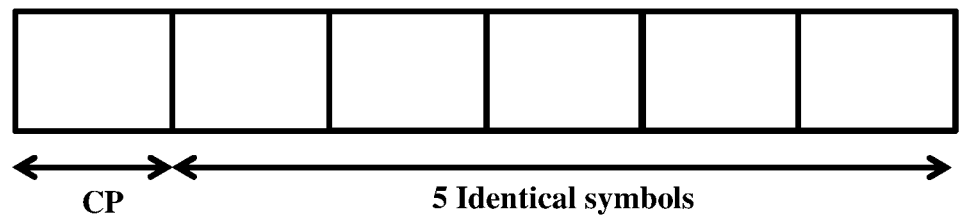
FIG. 1 illustrates a Random access preamble format, according to prior art.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Accordingly, the examples should not be construed as limiting the scope of the embodiments herein. Further it should be possible to combine the flows specified in different figures to derive a new flow.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The principal object of the embodiments herein is to provide a method and wireless device thereof for configuring and transmitting a RACH preamble in wireless communication network in general, and more particularly transmission of the random access preamble compliance with a TDD version of NB-IoT systems.

Further, the method includes configuring a NPRACH preamble for said TDD NB-IoT systems. The NPRACH preamble, as configured, comprises a first mini preamble and a second mini preamble.

Further, the NPRACH preamble, as configured, comprises preamble configuration parameters and a guard period (GP).

In general, (conventional or may be existing) systems, the FDD NB-IoT NPRACH preamble spreads in time domain over long duration in order to meet the design requirements of the NB-IoT communication system. However, the FDD NB-IoT NPRACH preamble configuration cannot be utilized in standardizing the TDD NPRACH preamble for NB-IoT systems, as the existing frame structures of the TDD-NPRACH can't accommodate such lengthy NPRACH preamble in the available UL sub-frames of the TDD configuration of frame structure.

Unlike to conventional method, the proposed method can be used to provide a novel configuration for the NPRACH preamble and further transmitting the configured NPRACH preamble which therefore meets the design requirement similar to that of the existing NPRACH preamble for TDD version of NB-IoT communication system.

In an embodiment, the configuration of the NPRACH preamble includes dividing the NPRACH preamble into a plurality of mini-preambles (for e.g., into the first mini preamble and the second mini preamble), where each mini preamble is transmitted in available consecutive UL sub-frames reserved for UL transmission. Each mini preamble comprises of a preamble part and a guard period (GP).

Referring now to the drawings, and more particularly to FIGS. 1 through 8, where similar reference characters denote corresponding features consistently throughout the figures, these are shown preferred embodiments.

FIG. 1 illustrates a Random access preamble format, according to prior art.

Referring to FIG. 1, in FDD-NPRACH, the physical layer random access preamble is based on single-subcarrier frequency-hopping symbol groups. As shown in the FIG. 1, a symbol group consisting of the CP of length Tcp and a sequence of five identical symbols with total length $T_{SEQ}$ is illustrated. The length of the NPRACH preamble can be altered based on the preamble format. For example, the Tcp and $T_{SEQ}$ values are listed in terms of LTE sampling time TS (~32.55 ns) as shown in Table. 1.

TABLE 1

| Preamble format | $T_{cp}$ | $T_{SEQ}$ |
| --- | --- | --- |
| 0 | $2048T_s$ | $5 \times 8192T_s$ |
| 1 | $8192T_s$ | $5 \times 8192T_s$ |

The NPRACH preamble consisting of four symbol groups is transmitted without time gaps. Effective FDD-NPRACH preamble durations for the two formats (format-0 and format-1) are given below in Table.2.

TABLE 2

| Preamble format | Preamble duration |
| --- | --- |
| 0 | $172032T_s \approx 5.6$ ms |
| 1 | $196608T_s \approx 6.4$ ms |

The TDD NB-IoT should comply with the frame structure and UL-DL configurations of TD LTE. The TD LTE uses frame structure type-2 as shown in FIG. 2.

Figure 2:
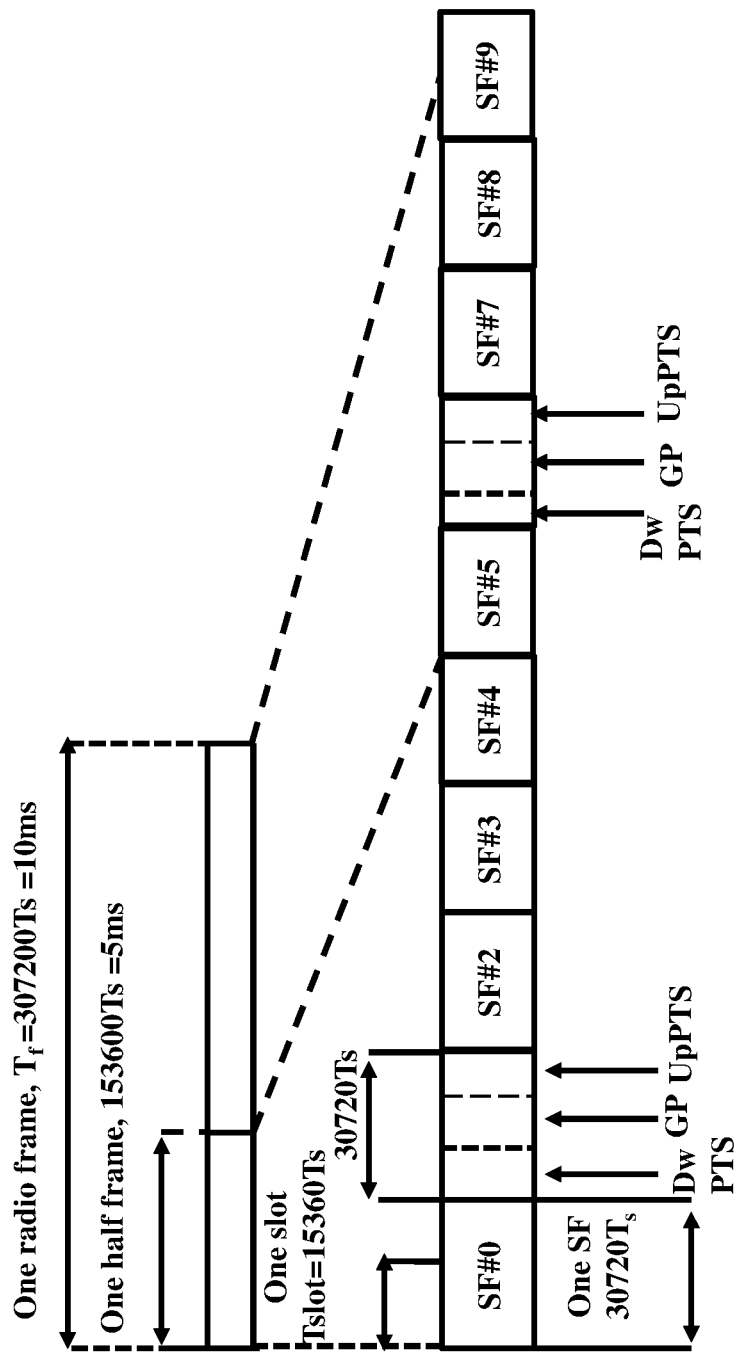
FIG. 2 illustrates a TDD-frame structure type 2 (for 5 ms switch-point periodicity), according to prior art.

FIG. 2 illustrates a TDD-frame structure (type-2 for 5 ms switch-point periodicity) according to existing LTE standard configuration.

In TDD, the UL and DL are transmitted on same frequency, where the UL and DL are shared in different instance of time (multiplexed in the time domain). Referring to the FIG. 2, a frame of ten milliseconds (10 ms) duration is divided into ten subframes (each subframe of duration 1 ms). The subframe can be uplink (UL), downlink (DL) or special sub-frame. The UL and DL subframe ratio and number of special subframes per frame varies according to the UL-DL configuration used. The available TD LTE UL-DL configurations are listed in Table 3, where "D" denotes subframe reserved for DL transmissions, "U" denotes subframe reserved for UL transmissions and "S" denotes a special sub-frame.

TABLE 3

| UL-DL configuration | DL-to-UL Switch-point periodicity | Sub-frame number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The "S" subframe is used for switching between DL and UL sub-frames. The "S" subframe is divided into 3 parts as shown in the FIG. 2: Downlink Pilot Time Slot (DwPTS), Guard Period (GP) and Uplink Pilot Time Slot (UpPTS). The time durations of DwPTS and UpPTS is shown in FIG. 3, subject to the total length of DwPTS, GP and UpPTS being equal to, for example, $30720.T_s = 1$ ms where "X" is the number of additional symbols in UpPTS provided by higher layer parameter. Depending on the "S" subframe configuration "X" can be either 2 or 4. Effective UL transmission duration is sum of total number of UL subframes and total number of UpPTS symbols. Maximum possible continuous UL transmission duration is the sum of 3 UL subframes (UL-DL configurations 0, 3 and 6) and 6 UpPTS symbols (special subframe configurations 5 and 9, when X=4), which is $105312.T_s = 3.428$ ms. Both preamble format (preamble format-0 and preamble format-1) durations (see table 2) are greater than maximum possible continuous UL reserved transmission duration. Hence, this limits the use of the existing FDD-NPRACH preamble design for standardizing of the TDD NB-IoT system.

Figure 4:
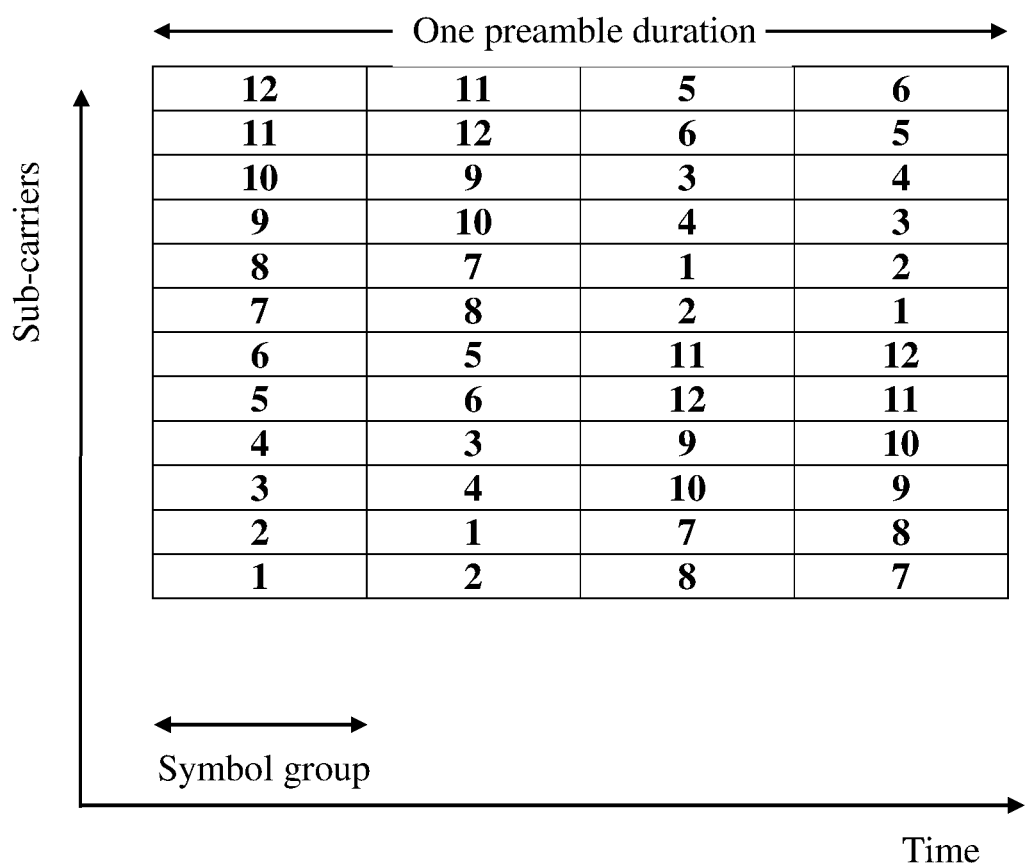
FIG. 4 illustrates Pseudo random hopping in FDD-NPRACH preamble, according to prior art.

FIG. 4 illustrates Pseudo random hopping in FDD-NPRACH preamble, according to prior art.

In conjunction with FIG. 2, where each subframe of the FDD-NPRACH preamble includes a Resource Block (RB) comprising of 12 sub-carriers (symbol group to be carried in each sub-carrier associated with 12 users, for example). The transmission of the FDD-NPRACH preamble employs a Pseudo random frequency hopping between the sub-carriers of symbol groups for the better estimation of timing accuracy.

Each symbol group, from the four symbol group of the FDD-NPRACH preamble, comprises, for example, 5 symbols preceded by the CP, as shown in FIG. 1. Referring to FIG. 4, where the four symbol groups (for example, each column can be referred to as one symbol group) are tabulated. The symbol groups are hopped across sub-carriers according to a random hopping pattern. For example, a first symbol group for a first user is transmitted in a sub-carrier 1. Similarly, a second symbol group, for the first user is transmitted in a sub-carrier 2, a third symbol group in a sub-carrier 8, and a fourth symbol group in a sub-carrier 7. Thus, a minimum preamble duration of 5.6 ms (including the CP duration) is necessitated in order to transmit the four symbol groups constituting one NPRACH preamble (for example, preamble format 0, please refer to the Table.1 and Table.2). In contrast, referring to the UL-DL configuration in case of TDD-LTE standard (as shown in Table. 3) maximum UL duration can be up to 3 ms (3 maximum consecutive UL resources, each of 1 ms, refer to UL-DL configuration 0, 3 and 6), only.

Thus, the embodiments of the present disclosure consider all the aforementioned design requirements of the existing NPRACH (for example, the FDD-NPRACH) in standardizing the TDD NB-IoT system but with restricted time resources.

Figure 5:
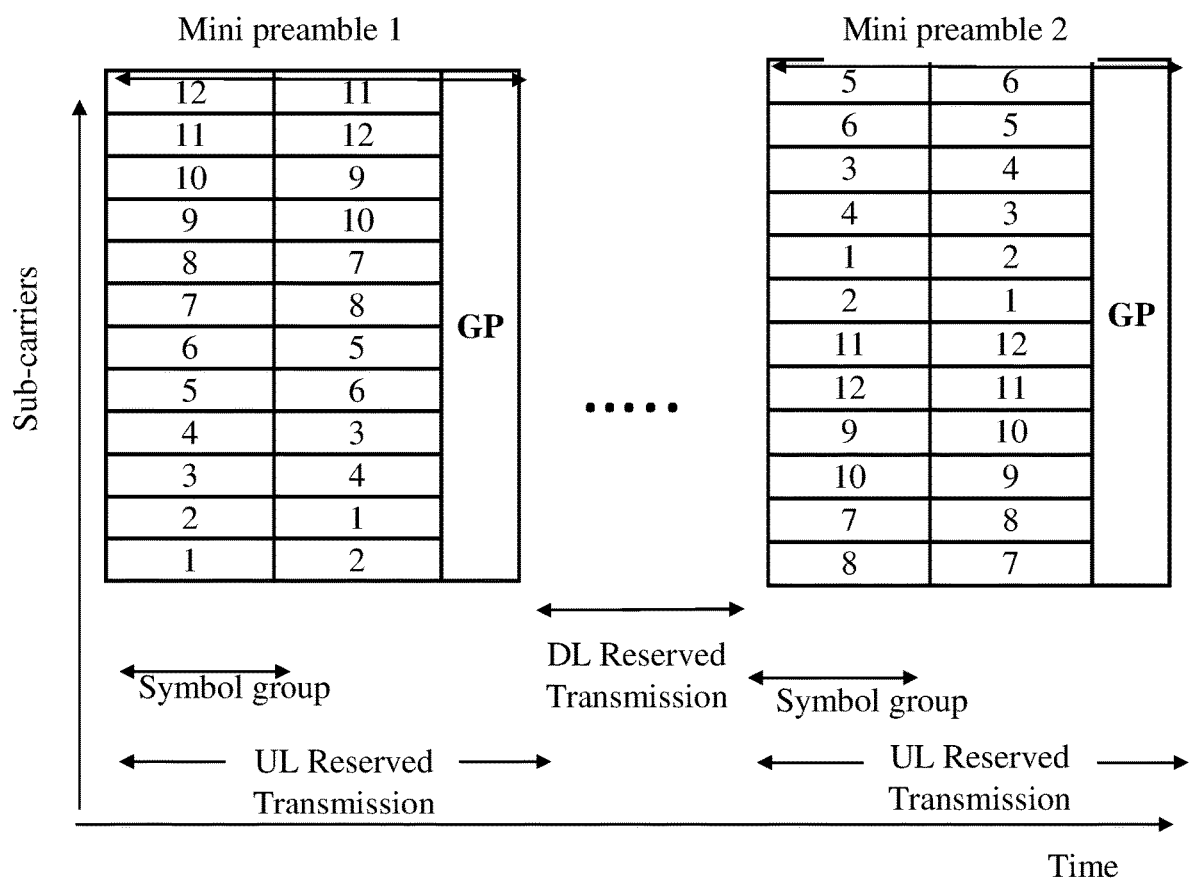
FIG. 5 illustrates a Pseudo random hopping configuration in transmission of first mini preamble and a second mini preamble, according to embodiments as disclosed herein.

FIG. 5 illustrates a Pseudo random hopping configuration in transmission of the first mini preamble and the second mini preamble, according to embodiments as disclosed herein.

Figure 6:
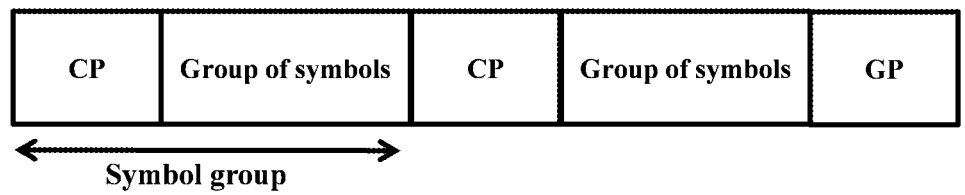
FIG. 6 illustrates an example of a mini preamble structure (first mini preamble/second mini preamble), according to embodiments as disclosed herein.

In conjunction with FIG. 4, the proposed method can be used to configure the NPRACH preamble comprising the first mini preamble and the second mini preamble. In an embodiment, configuring the NPRACH preamble includes, for example, dividing the NPRACH preamble into the first mini preamble and the second mini preamble. In an embodiment, each of the first mini preamble and the second mini preamble comprises the plurality of symbol groups followed by the GP. The GP allows for timing uncertainty due to the user to base station distance. Therefore the size of the GP determines the cell radius, and/or a duration of the GP is determined by a cell radius (as shown in FIG. 6).

For example, referring to UL-DL configuration of Table.3 the NPRACH preamble format "0" can be transmitted using the proposed NPRACH preamble structure i.e., the first mini preamble and the second mini preamble. The first mini preamble is transmitted in first available contiguous UL resources (example, sub-frame number 2, 3 and 4) and further the second mini preamble is transmitted in second available contiguous UL resources (example, sub-frame number 7, 8 and 9). Thus, the proposed NPRACH structure can be used to standardize the TDD NB-IoT systems.

In an embodiment, the number of symbols (N) in each of the symbol group is dependent on the UL-DL configuration used for transmission of the NPRACH preamble. For example, referring to the Table.3, "N" is one of 2 and 3 when the UL-DL configuration is one of 1, 4, and 6. Similarly, "N" is one of one of 4 and 5 when the UL-DL configuration is one of 0, 3, and 6, and "N" is 1 when the UL-DL configuration is one of 2 and 5. Further, "N" of the first mini preamble and of the second mini preamble can be one of same and different.

The first mini preamble and the second mini preamble are transmitted in the consecutive UL reserved transmissions as shown in FIG. 5. Any suitable preamble sequence can be used and also random hopping pattern can be same/different. Transmission of the first mini preamble and the second mini preamble can start from any available UL subframe or from any symbol of UpPTS in "S" subframe.

Further, the NB-IoT has a dedicated bandwidth of 45 KHz (12 sub carriers of each 3.75 KHz size) for NPRACH preamble transmission. So, all the transmissions happen in this bandwidth are asynchronous and expected to have severe inter symbol interference (ISI). In order to handle this problem, large CP lengths are used in the FDD-NPRACH preamble formats.

In TDD-NPRACH case, first symbol group of the mini preambles (the first/second mini preamble) is always preceded by the GP of special subframe in LTE or scheduled UpPTS symbols. When the mini preambles are preceded by the GP, the first CP has to handle DL synchronization error. In the other case, where the mini preambles are preceded by UpPTS symbols, the first CP has to handle DL synchronization error and delay spread. Hence, in the proposed method, the first CP length can be smaller than second CP as it does not preceded by asynchronous transmissions. The possible mini preamble formats can be seen in Table 4. These formats are defined for a cell radius of 35 km. Based on the cell size the GP duration can be varied. Format 1 suits to DL/UL configurations having two consecutive UL subframes. Format 2 suits to DL/UL configurations having three consecutive UL sub-frames. In both the formats, the lengths of first CP and second CP are chosen from the ranges provided based on the "S" subframe configuration.

Fi), Bluetooth, Bluetooth-Low Energy, 3G/4G/5G communication protocols etc. The RF transceiver 720 is operably coupled to the preamble configuration circuitry 730.

In an embodiment, the preamble configuration circuitry 730 can be used to configure the NPRACH preamble into the first mini preamble and the second mini preamble.

Further, the first mini preamble and the second mini preamble can be transmitted (i.e., UL transmission), as described in FIG. 5, using the RF transceiver 720. In an embodiment, the first mini preamble is transmitted in first available consecutive UL subframes and the second mini preamble in a subsequent continuous UL subframes reserved for UL transmission in at least one frame duration. In an embodiment, the frame can be one of a TDD LTE frame and a FDD LTE frame.

The memory 740 includes one or more computer readable storage media. The memory 740 can also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 740 may, in some examples, be considered a non-transitory storage medium. The term "non-transitory" may indicate that the storage medium is not embodied in a carrier wave or a propagated signal. However, the term "non-transitory" should not be interpreted to mean that the memory 740 is non-movable. In some examples, the memory 740 can be configured to store larger amounts of information than the memory. In certain examples, a non-transitory storage medium may store data that can, over time, change (e.g., in Random Access Memory (RAM) or cache).

The processor 750 may be, but not restricted to, a Central Processing Unit (CPU), a microprocessor, or a microcontroller. The processor 750 may be operably coupled to the memory 740, the preamble configuration circuitry 730 and the RF transceiver 720. The processor 750 executes sets of instructions stored on the memory 740.

Figure 8:
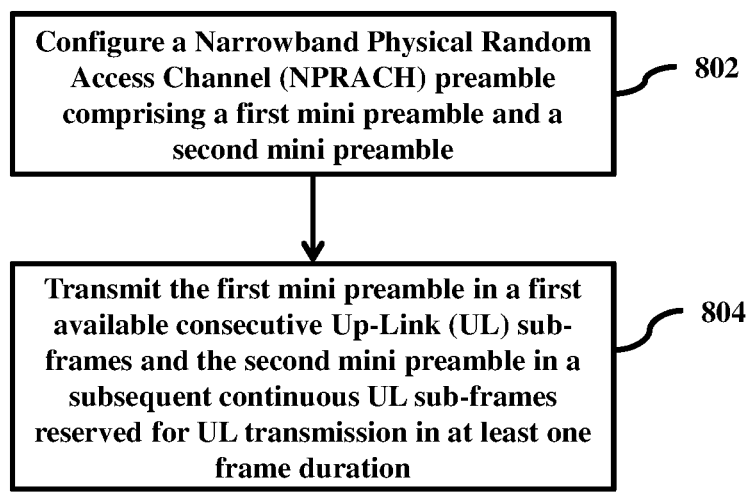
FIG. 8 is a flow diagram illustrating a method for configuring and transmitting the first mini preamble and the second mini preamble to a receiver, according to embodiments as disclosed herein.

FIG. 8 is a flow diagram illustrating a method for configuring and transmitting the first mini preamble and the second mini preamble, according to embodiments as disclosed herein.

TABLE 4

| Format | First CP length | Second CP length | Guard Period (GP) | No. of symbols per symbol group | Mini preamble duration |
| --- | --- | --- | --- | --- | --- |
| 1 | $269 \cdot T_s$-$2126 \cdot T_s$ | $2048 \cdot T_s$-$8192 \cdot T_s$ | $7167 \cdot T_s$ | 3 ($3*8192 \cdot T_s$) | $58636 \cdot T_s$-$66637 \cdot T_s$ (1.9087 ms-2.1691 ms) |
| 2 | $269 \cdot T_s$-$2126 \cdot T_s$ | $2048 \cdot T_s$-$8192 \cdot T_s$ | $7167 \cdot T_s$ | 5 ($5*8192 \cdot T_s$) | $91404 \cdot T_s$-$99405 \cdot T_s$ (2.9754 ms-3.2358 ms) |

Figure 7:
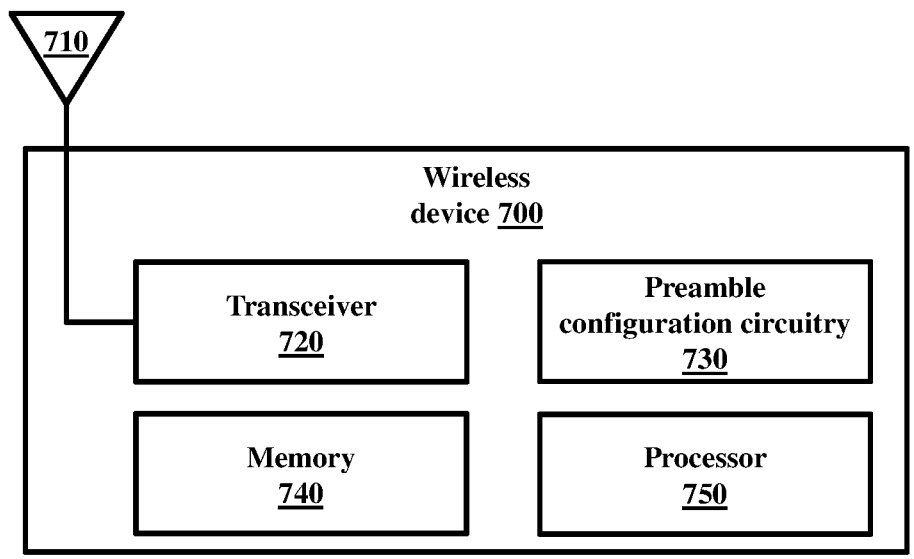
FIG. 7 is a block diagram illustrating hardware components of a wireless device, according to embodiments as disclosed herein.

FIG. 7 is a block diagram illustrating hardware components of a wireless device 700, according to embodiments as disclosed herein.

The wireless device 700 can be for example, a mobile terminal, a User Equipment (UE), and the like. The wireless device 700 can communicate the first mini preamble and the second mini preamble with a base station (BS)/an eNodeB (eNB). In an embodiment, the wireless device includes a RF transceiver 720, a preamble configuration circuitry 730, a processor 740, and a memory 750.

The RF transceiver 720 is associated with an antenna system 710 and includes a signal transmitter and a signal receiver for receiving and transmitting data signals. The RF transceiver 720 includes any or a combination of chipsets that support communication through wireless fidelity (Wi- Referring to FIG. 8, at step 802, the method includes configuring the NPRACH preamble comprising the first mini preamble and the second mini preamble. In an example, as shown in FIG. 7, the preamble configuration circuitry 730 can be used to configure the NPRACH preamble comprising the first mini preamble and the second mini preamble.

At step 804, the method includes transmitting the first mini preamble in the first available consecutive UL subframes and the second mini preamble in the subsequent continuous UL sub-frames reserved for UL transmission in at least one frame duration. In an example, as shown in FIG. 7, the RF transceiver 720 can be configured to transmit the first mini preamble in the first available consecutive UL subframes and the second mini preamble in the subsequent continuous UL sub-frames reserved for UL transmission in at least one frame duration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for transmitting a Physical Random Access Channel (PRACH) preamble in a wireless communication network, the method comprising:
    dividing, by a wireless device, a Narrowband Physical Random Access Channel (NPRACH) preamble into a plurality of symbol groups;
    selecting, by the wireless device, at least one first symbol group from the plurality of symbol groups and at least one second symbol group from the plurality of symbol groups;
    adding, by the wireless device, a first Guard Period (GP) between the at least one first symbol group and the at least one second symbol group, wherein the first GP is added at the end of the at least one first symbol group;
    adding, by the wireless device, a second GP at an end of the at least one second symbol group; and
    transmitting, by the wireless device, the at least one first symbol group along with the first GP in first available consecutive Up-Link (UL) sub-frames; and
    transmitting, by the wireless device, the at least one second symbol group along with the second GP in subsequent consecutive UL sub-frames after transmission of the at least one first symbol group along with the first GP, wherein the first available consecutive UL sub-frames and the subsequent consecutive UL sub-frames are reserved for UL transmission in at least one frame duration.

2. The method of claim 1, wherein the frame is one of a Time Division Duplex (TDD) LTE frame and a Frequency Division Duplex (FDD) LTE frame.

3. The method of claim 1, wherein a duration of the first GP and the second GP is determined by a cell radius.

4. The method of claim 1, wherein the at least one first symbol group and the at least one second symbol group are hopped across frequency resources.

5. The method of claim 1, wherein the at least one first symbol group and the at least one second symbol group comprises at least one symbol preceded by a Cyclic Prefix (CP).

6. The method of claim 5, wherein a length of the CP in a first symbol group of the at least one first symbol group is one of shorter than and equal to a length of the CP in the remaining symbol groups of the same at least one first symbol group, and wherein a length of the CP in a first symbol group of the at least one second symbol group is one of shorter than and equal to a length of the CP in the remaining symbol groups of the same at least one second symbol group.

7. The method of claim 6, wherein the length of CP is based on at least one of UL-DL configuration and special sub-frame configuration.

8. The method of claim 1, wherein a number of symbols in the at least one first symbol group and the at least one second symbol group depends on a UL-DL configuration to be used for transmission of the NPRACH preamble.

9. The method of claim 8, wherein the number of symbols in the at least one first symbol group and the at least one second symbol group is one of 2 and 3 when the UL-DL configuration is one of 1, 4, and 6.

10. The method of claim 8, wherein the number of symbols in the at least one first symbol group and the at least one second symbol group is one of 4 and 5 when the UL-DL configuration is one of 0, 3, and 6.

11. The method of claim 8, wherein the number of symbols in the at least one first symbol group and the at least one second symbol group is 1 when the UL-DL configuration is one of 2 and 5.

12. The method of claim 8, wherein the number of symbols in the at least one first symbol group and the at least one second symbol group is one of same and different.

13. A wireless device for transmitting a Physical Random Access Channel (PRACH) preamble in a wireless communication network, the wireless device comprising:
    a processor;
    a memory;
    a preamble configuration circuitry for:
        dividing a Narrowband Physical Random Access Channel (NPRACH) preamble into a plurality of symbol groups,
        selecting at least one first symbol group from the plurality of symbol groups and at least one second symbol group from the plurality of symbol groups,
        adding a first Guard Period (GP) between the at least one first symbol group and the at least one second symbol group, wherein the first GP is added at the end of the at least one first symbol group,
        adding a second GP at an end of the at least one second symbol group; and
    a transceiver, coupled with the preamble configuration circuitry, configured for:
        transmitting the at least one first symbol group along with the first GP in first available consecutive Up-Link (UL) sub-frames, and
        transmitting, by the wireless device, the at least one second symbol group along with the second GP in subsequent consecutive UL sub-frames after transmission of the at least one first symbol group along with the first GP, wherein the first available consecutive UL sub-frames and the subsequent consecutive UL sub-frames are reserved for UL transmission in at least one frame duration.

14. The wireless device of claim 13, wherein the frame is one of a Time Division Duplex (TDD) LTE frame and a Frequency Division Duplex (FDD) LTE frame.

15. The wireless device of claim 13, wherein a duration of the first GP and the second GP is determined by a cell radius.

16. The wireless device of claim 13, wherein the at least one first symbol group and the at least one second symbol group are hopped across frequency resources.

17. The wireless device of claim 13, wherein the at least one first symbol group and the at least one second symbol group comprises at least one symbol preceded by a Cyclic Prefix (CP).

18. The wireless device of claim 17, wherein a length of the CP in a first symbol group of the at least one first symbol group is one of shorter than and equal to a length of the CP in the remaining symbol groups of the same at least one first symbol group, and wherein a length of the CP in a first symbol group of the at least one second symbol group is one of shorter than and equal to a length of the CP in the remaining symbol groups of the same at least one second symbol group.

19. The wireless device of claim 17, wherein the length of CP is based on at least one of UL-DL configuration and special sub-frame configuration.

20. The wireless device of claim 13, wherein a number of symbols in the at least one first symbol group and the at least one second symbol group depends on a UL-DL configuration to be used for transmission of the NPRACH preamble.

21. The wireless device of claim 13, wherein the number of symbols in the at least one symbol first group and the at least one second symbol group is one of 2 and 3 when the UL-DL configuration is one of 1, 4, and 6.

22. The wireless device of claim 13, wherein the number of symbols in the at least one first symbol group and the at least one second symbol group is one of 4 and 5 when the UL-DL configuration is one of 0, 3, and 6.

23. The wireless device of claim 13, wherein the number of symbols in the at least one first symbol group and the at least one second symbol group is 1 when the UL-DL configuration is one of 2 and 5.

24. The wireless device of claim 13, wherein the number of symbols in the at least one first symbol group and the at least one second symbol group is one of same and different.

* * * * *